Dec. 30, 1969   C. C. RIPLEY   3,486,975
FLUIDIC ACTUATED CONTROL ROD DRIVE SYSTEM
Filed Dec. 29, 1967                    2 Sheets-Sheet 1

INVENTOR.
CHARLES C. RIPLEY
BY Roland A. Anderson
ATTORNEY

Dec. 30, 1969
C. C. RIPLEY
3,486,975
FLUIDIC ACTUATED CONTROL ROD DRIVE SYSTEM
Filed Dec. 29, 1967
2 Sheets-Sheet 2
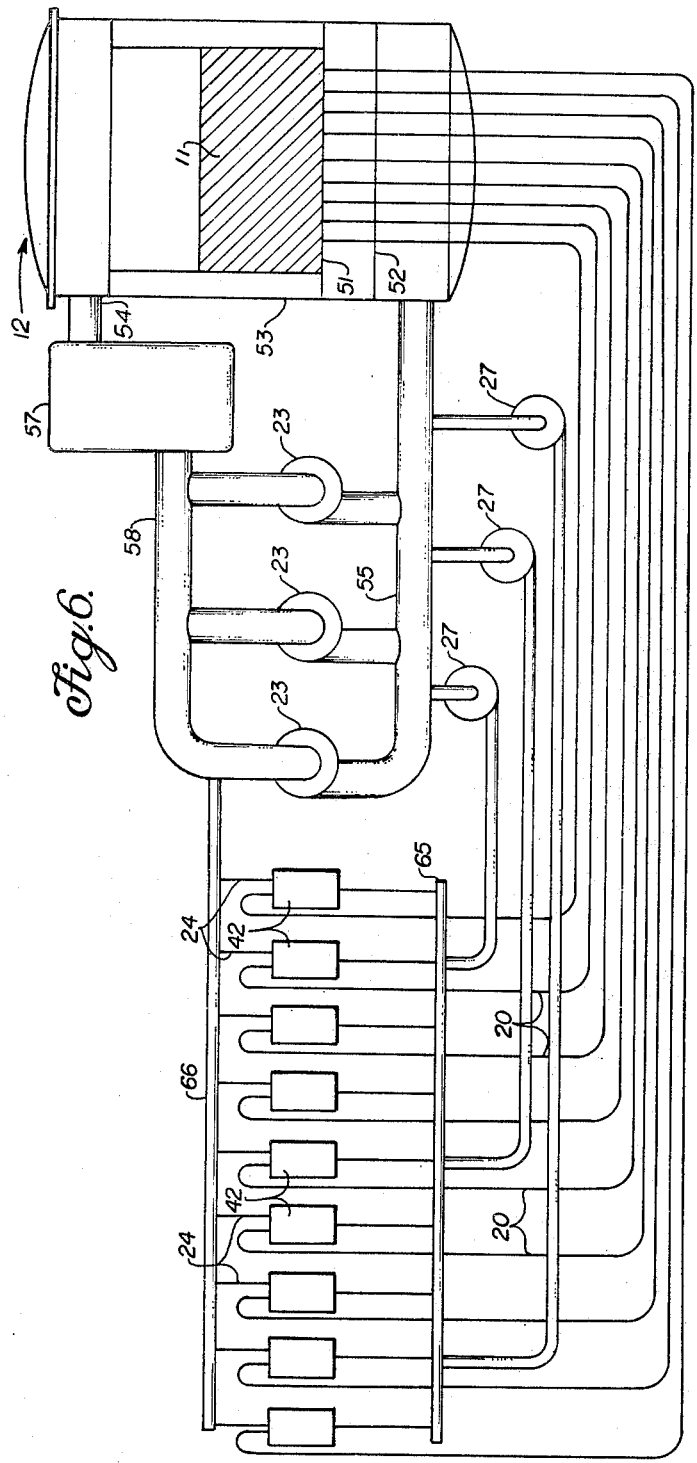
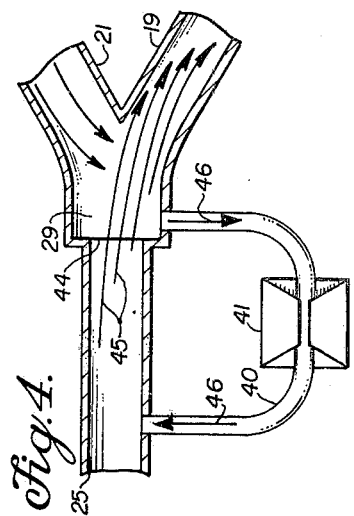
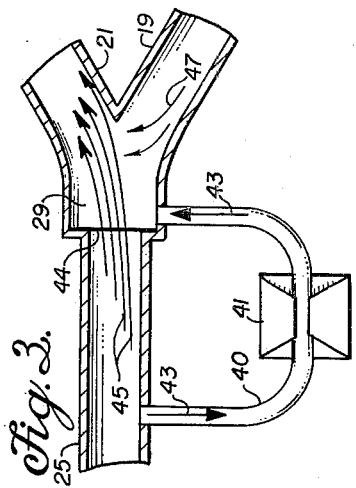
INVENTOR.
CHARLES C. RIPLEY
BY Roland A. Anderson
ATTORNEY

United States Patent Office 3,486,975
Patented Dec. 30, 1969

3,486,975
FLUIDIC ACTUATED CONTROL ROD DRIVE SYSTEM
Charles C. Ripley, San Jose, Calif., assignor to the United States of America as represented by the United States Atomic Energy Commission
Filed Dec. 29, 1967, Ser. No. 694,537
Int. Cl. G21c 7/14
U.S. Cl. 176—36            6 Claims

ABSTRACT OF THE DISCLOSURE

An hydraulically actuated piston and reactivity control rod is raised and lowered inside a cylindrical tube in the core of a nuclear reactor by the pressure of an electrically conductive fluid from one of two outputs of a fluidic amplifier valve. An electromagnetic pump associated with the fluidic amplifier valve controls the flow of electrically conductive fluid by diverting it to the cylindrical tube containing the piston and control rod.

BACKGROUND OF THE INVENTION

The invention described herein was made in the course of or under, Contract No. AT(04-3)-189, Project Agreement No. 47 with the United States Atomic Energy Commission.

This invention relates generally to nuclear reactor control rod elements, reflectors, or shields and in particular to control rod driving or motivating devices and systems.

In nuclear reactors utilizing neutron absorbing control rods to control reactivity, it is desirable to have as reliable and as safe a control system as possible, preferably a system that is fail-safe.

In control rod actuating systems of the prior art, mechanical drive devices are generally employed to insert the neutron absorbing control rod in the reactor core to decrease the reactivity or out of the core to increase the reactivity. In some cases, if hydraulic actuating systems are used, these also require mechanical devices such as valves to control the flow of hydraulic fluid. The valves of the prior art are generally of familiar construction in which some form of closure element was placed in the conduit conducting the fluid to block the passage of the fluid. In these systems, the mechanical parts are subject to wear and need constant monitoring to insure satisfactory operation of the system.

In the case of a nuclear reactor using liquid sodium not only as the reactor coolant but also as the force transmitting fluid in an hydraulic actuated control rod system, corrosion and wear of the mechanical parts becomes a major problem. Any shutdown of the reactor for the purpose of inspection, servicing or replacing valves or other control rod actuating parts represents a costly and time consuming operation.

SUMMARY OF THE INVENTION

The present invention overcomes these problems by having a minimum of moving parts, i.e., limited solely to a piston and connected control rod. The problem of wear of the moving parts is further minimized by the particular configuration of the piston which is provided with specially designed grooves about its periphery adjacent to the cylinder wall, not only permitting a greater clearance from the cylinder wall but also providing a self cleaning action to resist clogging and jamming of the piston.

The system of the present invention comprises, basically, a piston and connected control rod which is freely slidable in a cylindrical tube disposed in a nuclear reactor core, one end of the tube communicating with one output conduit of a fluidic amplifier valve, in turn communicating, through the input conduit of the fluidic amplifier, with the reactor primary coolant system.

It is, therefore, an object of this invention to provide a control rod system for a nuclear reactor having the least number of moving parts.

It is another object of this invention to provide a control rod system for a nuclear reactor in which a fluidic amplifier valve is used to control the movement of a control rod.

It is still another object of this invention to provide a control rod system for a nuclear reactor in which reactor coolant is used as a force transmitting fluid to actuate a control rod.

It is yet another object of this invention to provide a control rod system for a nuclear reactor in which an electromagnetic pump acting on an electrically conductive force transmitting fluid controls the movement of a control rod.

Other and more particular objects of this invention will be manifest upon study of the following detailed description when taken together with the accompanying drawing.

BRIEF DESCRIPTION OF THE DRAWING

FIGURE 3 is a schematic diagram showing the flow of fluid through the fluidic amplifier when the electromagnetic pump is not energized;

FIGURE 4 is a schematic diagram showing the flow of fluid through the fluidic amplifier when the electromagnetic pump is energized;

FIGURE 6 is a schematic diagram showing a plurality of fluidic amplifier valves in a typical plural control rod reactor system.

DESCRIPTION OF THE PREFERRED EMBODIMENT

Figure 1:
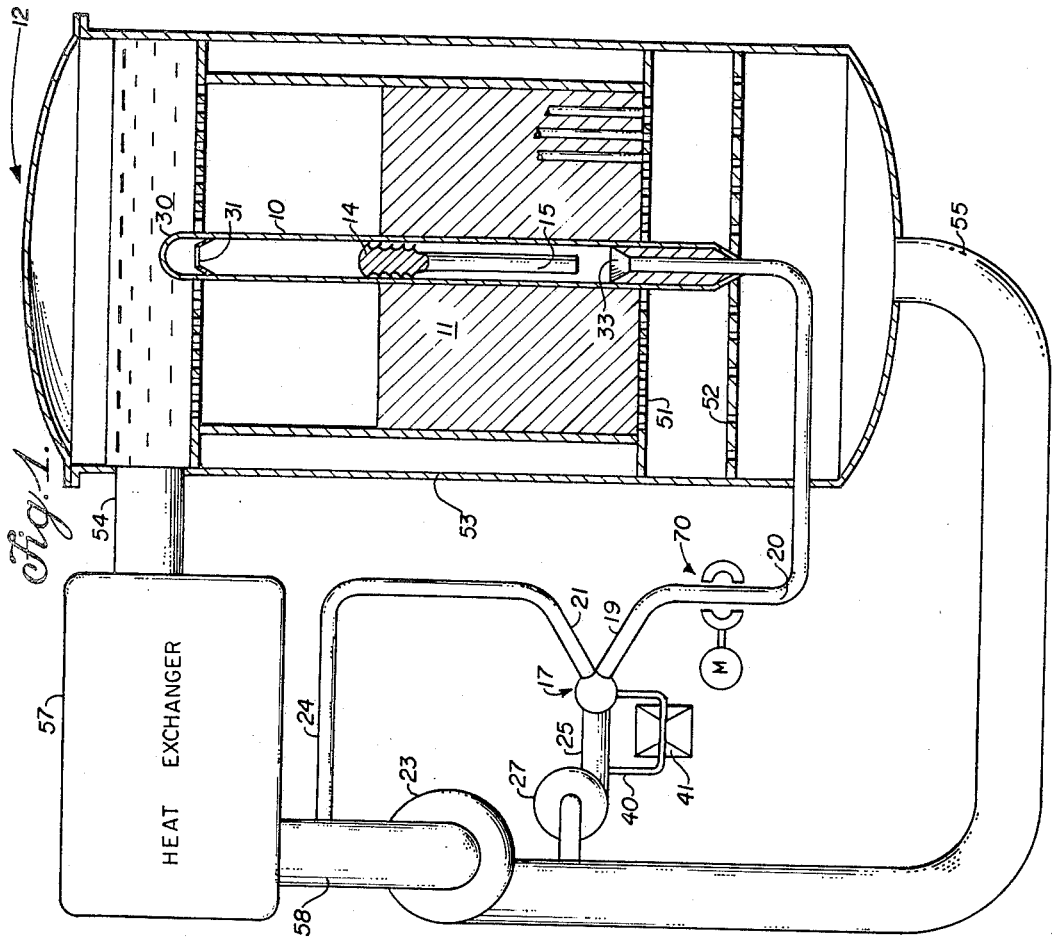
FIGURE 1 is a schematic diagram showing the arrangement of the essential elements of this invention for one control rod.

With reference to FIGURE 1, the essential elements of the control rod drive system of the present invention comprise at least one cylindrical tube 10 with at least a portion passing through the neutron field of a core 11 of a nuclear reactor 12, a piston 14 and connected control rod 15 which are freely slidable in tube 10 to enter or leave the neutron field of the reactor, and a fluidic amplifier valve 17 having a first output conduit 19 communicating with the lower end of cylindrical tube 10 through conduit 20, a second output conduit 21 communicating with the low pressure side of primary coolant pump 23 through conduit 24, and an input conduit 25 communicating with the high pressure side of pump 23 through booster pump 27.

The nuclear reactor system in which the present invention is utilized has been simplified for the purpose of illustration and comprises, basically, a core 11 of fissile fuel with moderator arranged therein or as a reflector or the like as required by particular designs, an upper support plate 51 for supporting core 11, a lower support plate 52 for supporting cylindrical tube 10, all of which are mounted in a pressure vessel 53 which is equipped with a coolant outlet conduit 54 at its upper end and a coolant inlet conduit 55 at its lower end for circulating coolant through core 11. Coolant leaving reactor 12 passes through a heat exchanger 57 from outlet conduit 54 then into primary coolant circulating pump 23 through conduit 58 and then back into reactor 12 through inlet conduit 55. The heat extracted by heat exchanger 57 is converted into useful energy by means well known in the art but is not illustrated herein since it forms no part of the present invention.

In the present invention, the reactor coolant is sodium, an electrically conductive fluid, which is suspectible to both pumping and metering of its flow by electromagnetic means. However, other liquid metal coolants such as sodium, potassium (NaK), bismuth, mercury, etc., may be used.

In detail, with reference to FIGURE 1, cylindrical tube 10 can be a plurality of such tubes disposed in ordered array throughout core 11 of nuclear reactor 12. For simplicity in illustrating a specific embodiment of this invention only one unit is shown.

At the top of cylindrical tube 10 is a bail 30 for lifting tube 10, piston 14 and control rod 15 out of reactor 12. An orifice 31 is also provided at the top of tube 10 to throttle the flow of fluid out of tube 10 and thus control the rate of ascent of piston 14. When piston 14 reaches orifice 31, the constriction defining the orifice acts as a stop to prevent further upward movement of piston 14. When piston 14 is at its uppermost position, control rod 15 will be fully withdrawn from core 11 thereby permitting an increase in reactivity therein according to principles well known in the art.

Proximate the bottom of tube 10 is nozzle 33 defining the terminus of conduit 20 in tube 10. Nozzle 33 is constricted so that it also acts as a stop to prevent further downward movement of control rod 15 below the level of core 11.

Thus, it can be seen that by causing a flow of fluid through conduit 20 and up through tube 10, piston 14 and control rod 15 can be raised and withdrawn from core 11. By stopping the flow of fluid in conduit 10, piston 14 and control rod 15 will descend into core 11 by virtue of the force of gravity and the generally higher back pressure inside reactor pressure vessel 53 acting against the top of piston 14.

Figure 2:
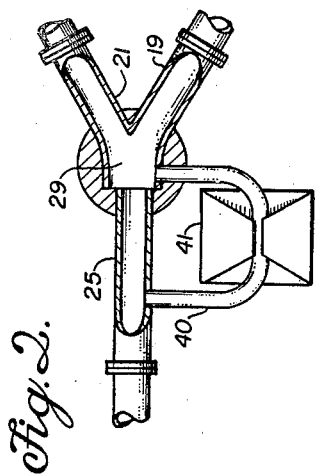
FIGURE 2 is a longitudinal section through the fluidic amplifier valve.

With reference to FIGURE 2, fluidic amplifier valve 17 is shown in greater detail. It comprises, basically, a diversion chamber 29 having one opening communicating with an input conduit 25 and two other openings communicating respectively with a first output conduit 19 and a second output conduit 21. A deflector conduit 40 communicates one side of chamber 29 with input conduit 25. A pump 41 is associated with conduit 40 so that when not energized, fluid from conduit 25 is free to flow through conduit 40 into chamber 29. In the present embodiment, pump 41 is an electromagnetic pump since the fluid used both as the reactor coolant and force transmitting fluid to raise piston 14 and control rod 15 is liquid sodium, an electrically conductive fluid. Pump 41 need not be of any particular design but may be any electromagnetic pump common in the art with the desired pumping characteristics to overcome the back pressure between chamber 29 and conduit 25. When energized, pump 41 is arranged so that the flow of fluid may be either reversed in conduit 40, causing liquid sodium to flow from chamber 29 to conduit 25 or stop the flow of fluid in conduit 40.

The action of fluidic amplifier valve 17 can best be illustrated by referring to FIGURES 3 and 4. In FIGURE 3, electromagnetic pump 41 is *not* energized so that a small amount of fluid as represented by arrows 43 can be caused to flow into chamber 29 either by pressure drop due to frictional losses between conduit 25 and chamber 29 or by a constricting orifice 44 at the point where the flow of fluid enters chamber 29.

The flow of fluid in conduit 25 is represented by flow lines 45. In the situation where fluid is flowing into chamber 29 from conduit 40, a force is transmitted by the fluid as indicated by arrow 42 at an angle to the flow of the main force transmitting fluid (arrows 45) flowing out of conduit 25 into chamber 29. By adjusting the flow rate of fluid leaving conduit 40, a sufficient force can be transmitted to deflect the main force transmitting fluid stream into second output conduit 21. Under these conditions, the flow of fluid into conduit 21 will be maintained with the help of the Coanda Effect, i.e., the tendency of a flowing fluid to attach itself to the upper wall of the chamber along which it is flowing. Therefore, with no power to the pilot electromagnetic pump, the flow of the fluid is away from the reactor tending to place and keep the control element in the core to maintain the reactor in a shutdown condition. This feature is highly desirable in that a fail safe situation results.

In FIGURE 4, electromagnetic pump 41 is now energized to cause fluid to be pumped from chamber 29 back into input conduit 25 as indicated by arrows 46. The condition now exists where the fluid flowing out of conduit 25 into chamber 29 as indicated by arrows 45, encounters a force which pulls it toward the lower wall of chamber 29 leading to first output conduit 19. The flow of the main force transmitting fluid is then caused to attach itself to the lower wall of chamber 29 leading to conduit 19, continuing to flow in that manner with the help of the Coanda Effect previously discussed. The flow of the control fluid is towards the reactor which raises the control rods in the reactor activation direction. Thus, it is only possible to activate the reactor when control power is available to the pilot electromagnetic pump.

It can be seen that when pump 41 is energized, the flow of the main force transmitting fluid, indicated by arrows 45, will be into conduit 19, through conduit 20 (FIGURE 1) and into tube 10 so that piston 14 and control rod 15 will be caused to rise in tube 10 and be withdrawn from core 11.

When a "scram," i.e., a condition which requires the reactor to be shutdown, occurs, pump 41 is deenergized so that fluid is free to flow from conduit 25 through conduit 40 and back into input chamber 29 diverting the main force transmitting fluid flow from conduit 19 to conduit 21, then through conduit 24 and into the low pressure side of primary coolant pump 23 at conduit 58. The pressure in first output conduit 19, conduit 20 and tube 10 is thereby reduced and the flow of fluid therein reversed by the entrainment of fluid, indicated by arrows 47 (FIGURE 3), into the flow of fluid into conduit 21. Thus, the force holding piston 14 and control rod 15 at the top of tube 10 is removed and with the help of gravity and the back pressure in pressure vessel 53, piston 14 and control rod 15 are caused to descend into core 11.

Figure 5:
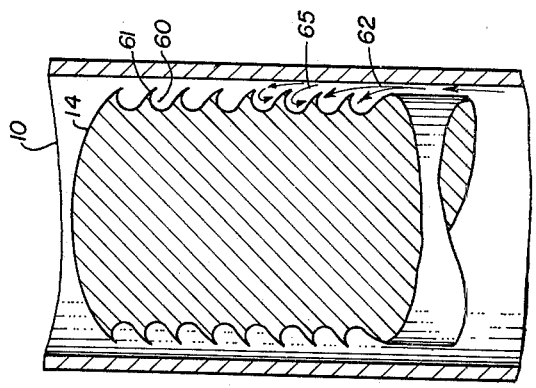
FIGURE 5 is a section through the piston used to raise and lower the control rod.

Referring to FIGURE 5, piston 14 in cylindrical tube 10 is shown in greater detail. Along the vertical surface of piston 14 adjacent the inside wall of cylindrical tube 10 are a plurality of annular recesses 60 having sharp edged downward projecting lips 61. Lips 61 are curved downwardly so that fluid flowing up tube 10 between piston 14 and the inside wall of cylinder 10, as indicated by arrows 62 is diverted by lip 61 into annular recess 60 where, by virtue of the generally circular cross section of annulus 60, the fluid reverses direction as indicated by arrows 63 providing both an upward reaction force on piston 14 and a swirling action to maintain any solid particles in suspension in the fluid. Thus, the probability of jamming the piston with solid particles entrained in the fluid is reduced.

The clearance between lips 61 and the inside wall of tube 10 is made large enough to provide a flow of fluid therebetween for both the purpose of supporting piston 14 by the static and dynamic forces of the fluid against piston 14 and the annular recesses 60 and permiting a sufficient flow of fluid, in the present embodiment, liquid sodium, to first; avoid plugging of the conduits by solidified sodium and second; to maintain the flow of fluid through fluidic amplifier valve 17 since it is the dynamic characteristics of flow through valve 17 which cause it to operate. To monitor the flow of liquid sodium through conduit 20 and into cylindrical tube 10, a flow meter 70 (FIGURE 1), in the present embodiment, an electromagnetic flow meter, is used. With this arrangement an alarm system (not shown), could be connected to meter 70 to warn when no sodium flows in conduit 20.

To operate the embodiment illustrated in FIGURE 1, the pressure of fluid passing through fluidic amplifier 17, in order for the fluid to be effective to transmit sufficient force to raise piston 14 and control rod 15, must be large enough to overcome not only the weight of piston 14 and rod 15 but also overcome the internal pressure inside pressure vessel 53. For this reason, a booster pump 27 is provided between coolant inlet conduit 55 on the high pressure side of primary coolant pump 23 and fluidic amplifier valve 17.

For example, for a pressure in conduit 55 of about 100 p.s.i., booster pump 27 should be capable of raising the pressure at fluidic amplifier valve 17 to about 220 p.s.i. Assuming a pressure drop from frictional losses of about 5 p.s.i. for conduit 55 and 113 p.s.i. for conduit 20, the pressure inside vessel 53 before the coolant enters the core, would be about 95 p.s.i. at conduit 55 where it enters pressure vessel 53. Assuming an 85 p.s.i. pressure drop through the core, the exit pressure at outlet conduit 54 would be 10 p.s.i. Therefore, the pressure at the bottom of cylindrical tube 10 from conduit 20 would be about 107 p.s.i. while the pressure at the top of tube 10 would be about 10 p.s.i. The difference would, therefore, be about 97 p.s.i. between the top and the bottom of tube 10. For a two inch diameter piston, this pressure would be able to sustain a piston and control rod weight estimated about 250 lbs. when taking into account estimated frictional and leakage losses.

Thus for the present embodiment, when the reactor is in operation and primary coolant pump 23 is pumping liquid sodium into pressure vessel 53, booster pump 27 is pumping coolant from the high pressure side of pump 23 into fluidic amplifier valve 17. Under normal operating conditions, electromagnetic pump 41 is energized so that, as previously described, fluid does not flow from input conduit 25 through diversion chamber 29, thus the output flows fluid from amplifier valve 17 into first output conduit 19, through conduit 20 and into tube 10 to raise piston 14 and control rod 15 out of core 11.

Should an emergency condition develop requiring shutting down of the reactor or at least drastically reducing its reactivity, an alarm system (not shown) of a design common in the art, sensitive to any desired reactor characteristic, can be made to deenergize electromagnetic pump 41. When deenergized, pump 41 allows fluid to flow from input conduit 25 into diversion chamber 29 as previously described so that the main flow of fluid is diverted from first output conduit 19 to second output conduit 21, through conduit 24 and into the low pressure side of primary coolant pump 23 at conduit 58. The above also occurs should control power to the pilot electromagnetic pump fail. Thus a fail safety characteristic is achieved. The resulting decrease in hydraulic pressure at the bottom of tube 10 and the force of gravity along with entrainment of fluid from conduit 19 into conduit 21 as indicated by arrows 47 (FIGURE 3) will cause piston 14 and rod 15 to descend into core 11 thereby reduce reactivity therein in accordance with principles well known in the art.

With reference to FIGURE 6, there is illustrated a control rod drive system incorporating a plurality of the embodiment of the present invention. Fluidic amplifier 17 and electromagnetic pump 41 of FIGURE 1 are combined in FIGURE 6 for simplicity into an electromagnetic-fluidic valve 42 which performs the identical function as the separately illustrated elements of FIGURE 1. In FIGURE 6, one booster pump 27 is provided for every three electromagnetic-fluidic valves 42 using a common header manifold 65. Conduits 24 are similarly connected to manifold 66 communicating with coolant conduit 58 on the low pressure side of primary coolant pumps 23.

It can also be seen that, where the illustrated embodiment of the present invention incorporates a control rod as its reactivity modifying means, it could just as easily substitute a fissile fuel filled rod for the control rod. In such a situation, reactivity can be reduced by withdrawing the fuel rod from core 11 rather than inserting a neutron absorbing control rod. In such a configuration, the position of the fuel filled rod during normal operation of the reactor would be inside core 11. Upon diversion of fluid through fluidic amplifier valve 17 (FIGURE 1) away from tube 10, the fuel filled rod would descend into core 11 thus increasing reactivity from the core. For a fail safe configuration using a fissile fuel filled rod, tube 10 should be arranged so that the fuel rod enters the core from below. Thus a failure of pressure would permit the rod to descend out of the core and reduce reactivity of the core.

Although the foregoing embodiment has been described in detail, there are obviously many other embodiments and variations in configurations which can be made by a person skilled in the art without departing from the spirit, scope or principle of this invention. Therefore, this invention is not to be limited except in accordance with the appended claims.

I claim:

1. Control rod system for use in a nuclear reactor including a pressure vessel having an inlet and an outlet for a fluid coolant and a core of fissile fuel within said pressure vessel with said fluid coolant flowing therethrough comprising at least one cylindrical tube disposed in the neutron field of said core, a free floating piston slidably disposed in said cylindrical tube, a rod containing a reactivity modifying material connected to said piston for entering and leaving said neutron field of said core, and means for fluidically amplifying and switching a portion of said fluid coolant into one end of said cylindrical tube to raise said piston, said means comprising a fluidic switch having a diversion chamber, an input conduit in communication with said pressure vessel inlet and said diversion chamber, a first output conduit in communication with one end of said cylindrical tube and said diversion chamber, a second output conduit in communication with said pressure vessel outlet and said diversion chamber, and means communicating with one side of said diversion chamber for selectively diverting said fluid coolant entering said diversion chamber into one of said first and second output conduits.

2. The apparatus as claimed in claim 1 wherein said reactivity modifying material is a neutron absorbing material.

3. The apparatus as claimed in claim 1 wherein said reactivity modifying material is a fissile fuel.

4. The apparatus as claimed in claim 1 wherein said fluid coolant is an electrically conductive fluid, and wherein said diverting means includes an electromagnetic pump means.

5. The apparatus as claimed in claim 1 further comprising means for increasing the pressure of said fluid coolant from said pressure vessel inlet to said fluidic switch input conduit.

6. The apparatus as claimed in claim 1 wherein said means for diverting said fluid coolant comprises a conduit communicating said input conduit with one side of said diversion chamber and means for pumping said coolant fluid from said chamber to said input conduit.

References Cited

UNITED STATES PATENTS

| | | | |
|---|---|---|---|
| 2,952,600 | 9/1960 | Newson | 176—86 |
| 3,016,063 | 1/1962 | Hausmann | 137—81.5 |
| 3,088,902 | 5/1963 | Kumpf | 176—36 |
| 3,122,045 | 2/1964 | Zilberfarb | 137—81.5 |
| 3,297,537 | 1/1967 | Natland | 176—36 |
| 3,400,047 | 9/1968 | Howard | 176—61 |

CARL D. QUARFORTH, Primary Examiner

H. E. BEHREND, Assistant Examiner

U.S. Cl. X.R.

137—81.5